United States Patent [19]
Lyons et al.

[11] Patent Number: 5,140,244
[45] Date of Patent: Aug. 18, 1992

[54] LOCK DETECTOR FOR SWITCHED RELUCTANCE MACHINE ROTOR POSITION ESTIMATOR

[75] Inventors: James P. Lyons, Niskayuna; Stephen R. MacMinn, Schenectady, both of N.Y.

[73] Assignee: General Electric Company, Schenectady, N.Y.

[21] Appl. No.: 760,032

[22] Filed: Sep. 13, 1991

[51] Int. Cl.$^5$ ............................................... H02P 8/00
[52] U.S. Cl. ................................................... 318/701
[58] Field of Search ........................ 318/701, 138, 254

[56] References Cited
U.S. PATENT DOCUMENTS

| | | | |
|---|---|---|---|
| 4,470,000 | 9/1984 | Hienle | 318/805 |
| 4,739,240 | 4/1988 | MacMinn et al. | 318/696 |
| 4,772,839 | 9/1988 | MacMinn et al. | 318/696 |
| 4,959,596 | 9/1990 | MacMinn et al. | 318/254 |
| 4,961,038 | 10/1990 | MacMinn | 318/696 |

*Primary Examiner*—David Smith, Jr.
*Attorney, Agent, or Firm*—Jill M. Breedlove; James C. Davis, Jr.; Marvin Snyder

[57] ABSTRACT

A lock detector for a switched reluctance motor (SRM) position estimator monitors the rotor angle estimates from a SRM rotor position estimator to make sure that the estimator is accurately tracking rotor position. Phase flux and current measurements corresponding to the rotor angle estimate of the sampled phase are supplied to dividing circuitry which generates a phase inductance estimate. The phase inductance estimate is compared by logic circuitry to lower and upper inductance limits to determine whether the rotor angle estimate falls within a specified tolerance of a theoretical inductance value. Alternatively, a flux-current map is used to generate a phase flux reference for comparison to the phase flux estimate. A lock detector flip-flop is reset whenever the phase inductance estimate (or phase flux estimate) is outside the specified tolerance, and a signal is sent thereby to disable the SRM.

9 Claims, 6 Drawing Sheets

SHAFT ANGLE TRANSDUCER

ROTOR ANGLE FEEDBACK, $\theta$
TO CONTROL MEANS 50
(SEE FIG. 1B)

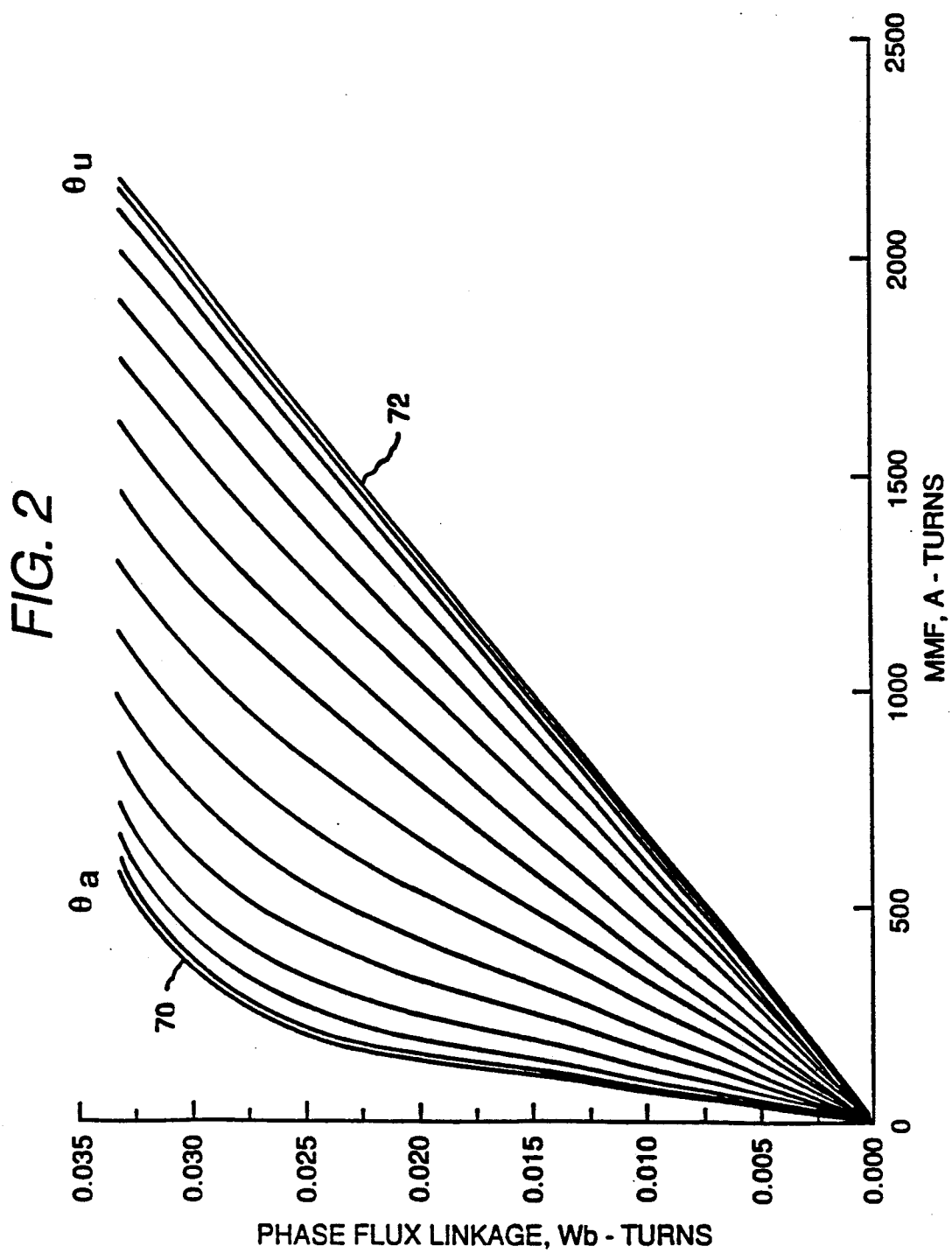

LOCK DETECTOR FOR SWITCHED RELUCTANCE MACHINE ROTOR POSITION ESTIMATOR

RELATED APPLICATIONS

This application is related to commonly assigned, copending U.S. patent application of J. P. Lyons, S. R. MacMinn and M. A. Preston, Ser. No. 07/760,639 filed concurrently herewith and incorporated by reference herein.

FIELD OF THE INVENTION

The present invention relates generally to rotor position estimators for switched reluctance machines and, more particularly, to a lock detector for making sure that a position estimator is accurately tracking rotor position.

BACKGROUND OF THE INVENTION

A switched reluctance machine (SRM) is a brushless, synchronous machine having salient rotor and stator poles. There is a concentrated winding on each of the stator poles, but no windings or permanent magnets on the rotor. Each pair of diametrically opposite stator pole windings is connected in series or in parallel to form an independent machine phase winding of the multiphase SRM. Ideally, the flux entering the rotor from one stator pole balances the flux leaving the rotor from the diametrically opposite stator pole, so that there is no mutual magnetic coupling among the phases.

Torque is produced by switching current in each phase winding in a predetermined sequence that is synchronized with angular position of the rotor. In this way, a magnetic force of attraction results between the rotor poles and stator poles that are approaching each other. The current is switched off in each phase before the rotor poles nearest the stator poles of that phase rotate past the aligned position; otherwise, the magnetic force of attraction would produce a negative or braking torque. Hence, by properly positioning the firing pulses relative to rotor angle, forward or reverse operation and motoring or generating operation can be obtained. Typically, the desired phase current commutation is achieved by feeding back the rotor position signal to a controller from a shaft angle transducer, e.g. an encoder or a resolver. To improve reliability and to reduce size, weight, inertia, and cost in such drives, it is desirable to eliminate this shaft position sensor. To this end, various approaches have been previously proposed for indirect rotor position sensing by monitoring terminal voltages and currents of the motor. One such approach, referred to as waveform detection, depends upon back electromotive forces (emf) and is, therefore, unreliable at low speeds and inoperative at zero speed.

Another approach to indirect rotor position sensing is disclosed in commonly assigned U.S. Pat. No. 4,772,839, issued Sep. 20, 1988 to S. R. MacMinn and P. B. Roemer, which patent is incorporated by reference herein. The cited patent describes an indirect position estimator for a SRM which applies low-level sensing pulses of short duration to the unenergized motor phases. Application of the sensing pulses results in a change in current in each of the unenergized phases. The change in current is sensed by a current sensor and an estimated inductance value is derived therefrom. A pair of estimated rotor angles corresponding to the estimated inductance value for each of the unenergized phases is ascertained. One such pair is shifted by a value equal to a known phase displacement of the other unenergized phase. The pairs of estimated angles are then compared to determine which of the angles match. An estimated instantaneous rotor angular position equal to the matching angle is produced. Moreover, in case any of the stator phases undergoes a change in state during sampling or in case two phases do not remain energized throughout the sampling, an extrapolator is provided to generate an extrapolated rotor angular position instead of the estimated position.

Still another approach to indirect rotor position sensing is disclosed in commonly assigned U.S. Pat. No. 4,959,596, issued to S. R. MacMinn, C. M. Stephens and P. M. Szczesny on Sep. 25, 1990, which patent is incorporated by reference herein. According to U.S. Pat. No. 4,959,596, a method of indirect rotor position sensing involves applying voltage sensing pulses to one unenergized phase. The result is a change in phase current which is proportional to the instantaneous value of the phase inductance. Proper commutation time is determined by comparing the change in phase current to a threshold current, thereby synchronizing phase excitation to rotor position. Phase excitation can be advanced or retarded by decreasing or increasing the threshold, respectively.

Even more recent approaches to indirect position estimation have been described in U.S. patent application Ser. No. 653,374 of J. P. Lyons and S. R. MacMinn, now allowed, and U.S. patent application Ser. No. 653,371 of J. P. Lyons, M. A. Preston and S. R. MacMinn, now allowed, both filed Feb. 11, 1991 and assigned to the instant assignee. The indirect position estimating methods of the hereinabove cited Lyons et al. patent applications, which are incorporated by reference herein, each avoid active probing of the motor phases since such active probing usually imposes speed limitations on the machine. For example, according to Lyons et al. patent application Ser. No. 653,374, instantaneous phase current and flux measurements are performed in a predetermined sequence that depends on the particular quadrant of operation, i.e. forward motoring, reverse motoring, forward generating, or reverse generating. For each phase in the predetermined sequence of sensing, phase flux and phase current measurements are made during operation in a pair of predetermined sensing regions, each defined over a range of rotor angles. Rotor angle estimates are derived from the phase flux and phase current measurements for each respective phase during the respective sensing regions thereof. The rotor angle estimates for each phase are normalized with respect to a common reference phase, and a rotor position estimate for the SRM is computed therefrom.

Alternatively, the method of Lyons et al. patent application Ser. No. 653,371 involves a flux/current model of the machine, which model includes multiphase saturation, leakage, and mutual coupling effects. The flux/current model includes a network mesh of stator, rotor and air gap reluctance terms. The network is driven by magnetomotive force terms corresponding to the ampere-turns applied to each of the stator poles. Phase current and flux sensing for each phase are performed simultaneously. The reluctance terms of the flux/current model are determined from the phase flux and current measurements. The phase current and flux measurements also determine the rotor position angle relative to alignment for each respective motor phase and which phase (or phases) is operating in its predetermined optimal sensing region defined over a range of rotor angles. The measurements on at least two phases are then used for establishing whether the stator phases of the sensing phase are approaching alignment or maximum unalignment with SRM rotor poles. Finally, the rotor position angle for the sensing phase and its position relative to alignment are used to provide a rotor position estimate for the motor.

The hereinabove described position estimation methods of the Lyons et al. patent applications may be conveniently implemented using a microprocessor. However, upon initialization, the microprocessor must take a series of measurements before the position estimates are sufficiently reliable. Such an initial acquisition sequence results in a period of time for which valid position estimates are not available. Furthermore, operation of a microprocessor can result in a variety of so-called soft-errors which can cause erratic operation; normal operation in the event of such soft-errors is resumed by resetting and restarting the microprocessor. It is desirable, therefore, to provide means for monitoring the position estimates produced by such a microprocessor-based estimator and detecting a loss of lock condition wherein the estimator is no longer accurately tracking rotor position.

OBJECTS OF THE INVENTION

Accordingly, an object of the present invention is to provide a lock detector for a SRM rotor position estimator for verifying the accuracy of position estimates produced thereby.

Another object of the present invention is to provide a lock detector for a SRM rotor position estimator for monitoring the position estimates produced thereby and for disabling the power electronics driving the SRM whenever an out-of-lock condition is detected.

SUMMARY OF THE INVENTION

The foregoing and other objects of the present invention are achieved in a new and improved lock detector for monitoring the rotor angle estimates generated by a SRM rotor position estimator to make sure that the estimator is accurately tracking rotor position. The lock detector of the present invention uses phase inductance estimates, which are based on phase flux measurements, to monitor the rotor angle estimates provided by the SRM position estimator. In a preferred embodiment, a multiplexer receives phase flux and current measurements and selects, via a lock detector control means, those measurements corresponding to the rotor angle estimate of the sampled phase. The respective phase flux and current measurements are supplied to a divider which generates a phase inductance estimate. The phase inductance estimate is compared by logic means to lower and upper inductance limits to determine whether it falls within a predetermined tolerance of a theoretical inductance value. A lock detector flip-flop is reset whenever the phase inductance estimate is outside the tolerance, and a signal is sent by the lock detector flip-flop to disable the SRM.

In an alternative embodiment, a phase flux estimate is compared with a phase flux reference, provided by a fluxcurrent map, to determine whether the phase flux estimate is within a predetermined tolerance of the phase flux reference.

BRIEF DESCRIPTION OF THE DRAWINGS

The features and advantages of the present invention will become apparent from the following detailed description of the invention when read with the accompanying drawings in which:

FIG. 2 is a graphical illustration of phase flux versus phase current for different values of rotor angle;

DETAILED DESCRIPTION OF THE INVENTION

Figure 1A:
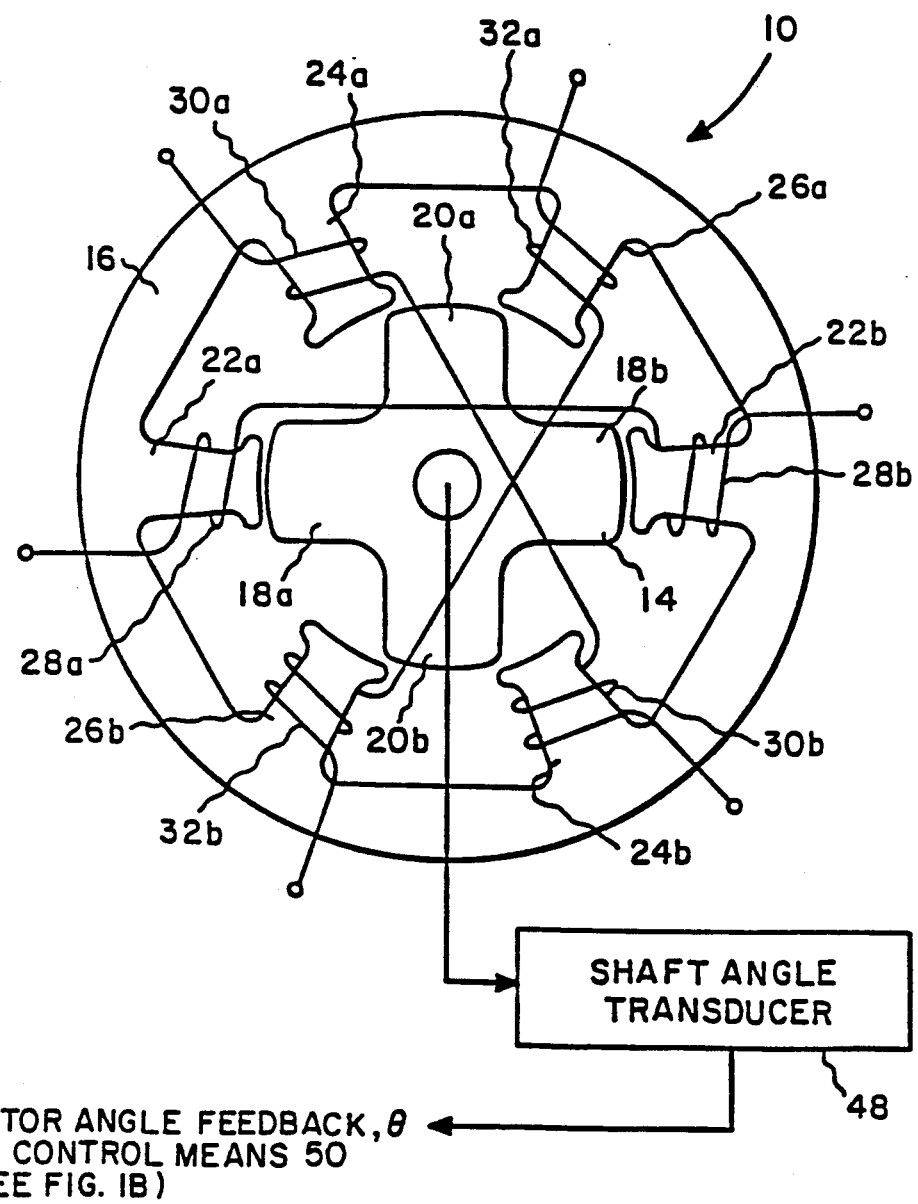
FIG. 1a and 1b are a schematic illustrations of a conventional SRM drive.
Figure 1B:
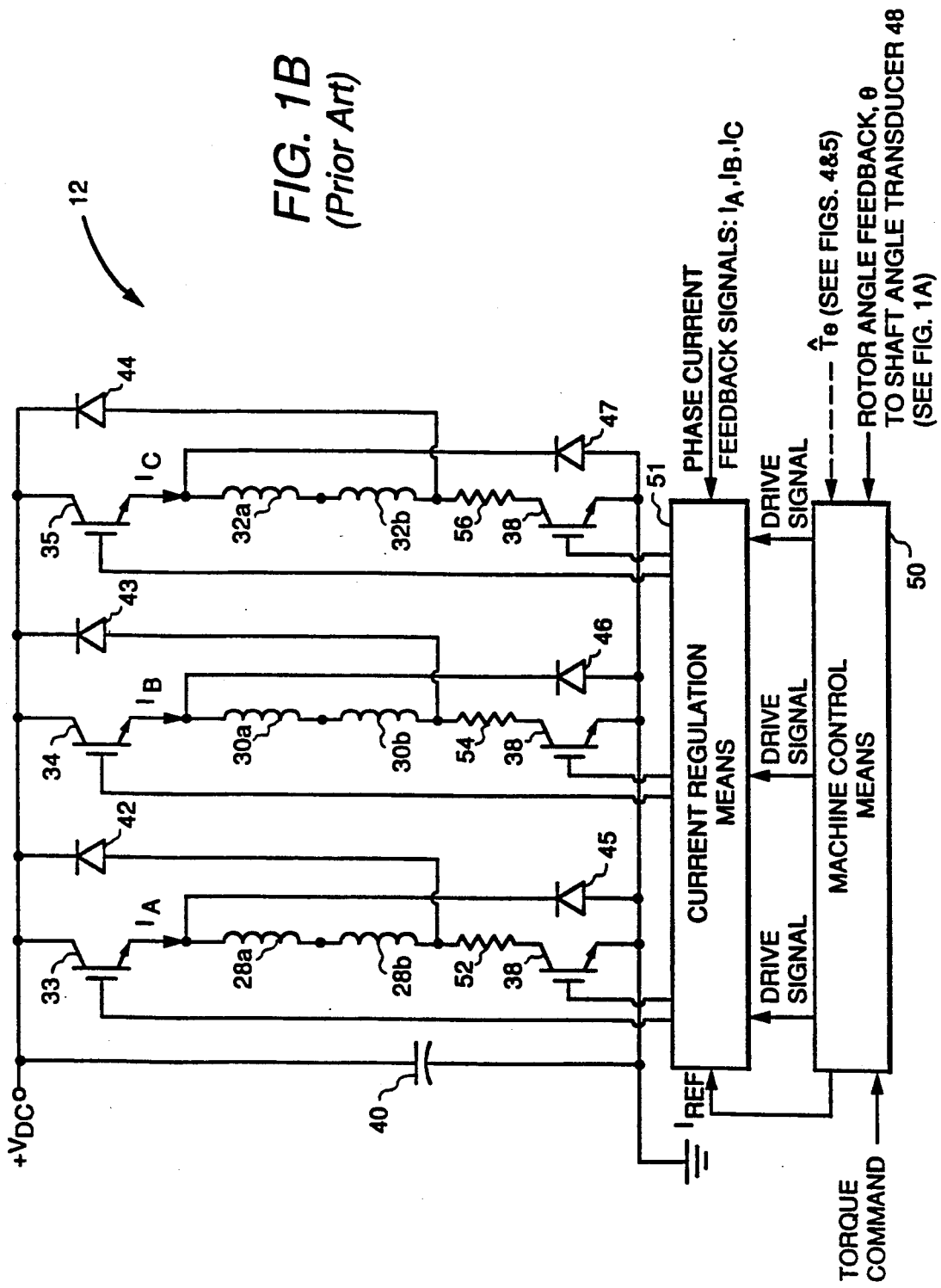

FIG. 1 shows a conventional SRM drive configuration. By way of example, SRM 10 is illustrated as a three-phase machine with its associated power inverter 12. As shown, SRM 10 includes a rotor 14 rotatable in either a forward or reverse direction within a stationary stator 16. Rotor 14 has two pairs of diametrically opposite rotor poles 18a-18b and 20a-20b. Stator 16 has three pairs of diametrically opposite stator poles 22a-22b, 24a-24b and 26a-26b. Stator pole windings 28a-28b, 30a-30b and 32a-32b, respectively, are wound on stator pole pairs 22a-22b, 24a-24b and 26a-26b, respectively. Conventionally, the stator pole windings on each pair of opposing or companion stator pole pairs are connected in series or parallel to form a machine phase winding. As illustrated in FIG. 1, the stator pole windings comprising each companion pair 28a-28b, 30a-30b and 32a-32b, respectively, are connected in series with each other and with an upper current switching device 33, 34 and 35, respectively, and with a lower current switching device 36, 37 and 38, respectively. The upper and lower switching devices are each illustrated as comprising an insulated gate bipolar transistor (IGT), but other suitable current switching devices may be used; for example, field effect transistors (FET's), gate turn-off thyristors (GTO's), or bipolar junction transistors (BJT's). Each phase winding is further coupled to a dc source, such as a battery or a rectified ac source, by flyback or return diodes 45 and 42, 46 and 43, and 47 and 44, respectively. At the end of each conduction interval of each phase, stored magnetic energy in the respective phase winding is returned, through the respective pair of these diodes connected thereto, to the dc source. Each series combination of the phase winding with two corresponding switching devices and two flyback diodes comprises one phase leg of inverter 12. The inverter phase legs are connected in parallel to each other and are driven by the dc source, which impresses a dc voltage $V_{dc}$ across the parallel inverter phase legs. Capacitance 40 is provided for filtering transient voltages from the dc source and for supplying ripple current to the inverter.

Typically, as shown in FIG. 1, a shaft angle transducer 48, e.g. an encoder or a resolver, is coupled to rotor 14 for providing rotor angle feedback signals to machine control means 50. An operator command, such as a torque command, is also generally supplied as an input signal to control means 50. Phase current feedback signals are supplied to a current regulation means 51 which receives phase current feedback signals $I_A$, $I_B$ and $I_C$ from current sensors 52, 54 and 56. Suitable current sensors are well-known in the art and may comprise, for example, Hall-effect sensors, sensing transformers, sensing transistors, or sensing resistors. Control means 50 further provides a commanded reference Current waveform $I_{REF}$ to current regulation means 51, as described in commonly assigned U.S. Pat. No. 4,961,038, issued to S. R. MacMinn on Oct. 2, 1990, which patent is incorporated by reference herein. In well-known fashion, such as described in commonly assigned U.S. Pat. No. 4,739,240, issued to S. R. MacMinn and P. M. Szczesny on Apr. 19, 1988, which patent is also incorporated by reference herein, the control means provides firing signals to inverter 12 for energizing the machine phase windings in a predetermined sequence, depending upon the particular quadrant of operation.

Saliency of both the rotor and stator of a SRM causes the machine to have an air gap of varying length. As a result, phase inductance as viewed from the stator phase windings is a strong function of rotor position. Specifically, phase inductance ranges from a maximum value $L_a$, corresponding to alignment of rotor poles with the stator poles of the respective phase, to a minimum value $L_u$, corresponding to maximum unalignment of rotor poles with the stator poles of the respective phase.

The current I in one phase winding of a SRM and the flux $\Psi$ linked by that winding are related by the winding inductance L according to the following expression:

$$\Psi = LI \quad (1)$$

Thus, if phase flux linkage $\Psi$ is plotted against phase current I, the slope of the resulting graph is the phase inductance. FIG. 2 graphically illustrates phase flux $\Psi$ versus magnetomotive force (mmf, in ampere-turns) for different values of rotor angle $\theta$. The bending of the curves at the higher values of flux $\Psi$ is caused by magnetic saturation of the iron in the motor. Curve 70, which has the steepest initial slope, represents the $\Psi-I$ curve for the excited phase when the stator poles of that phase are aligned with rotor poles, the rotor angle corresponding thereto being designated as $\theta_a$. On the other hand, curve 72, which has the smallest initial slope, represents the $\Psi-I$ curve for the excited phase when the stator poles of that phase are at the point of maximum unalignment with rotor poles of the SRM, the rotor angle corresponding thereto being designated as $\theta_u$. The curves falling between curves 70 and 72 represent intermediate inductance values corresponding to varying degrees of rotor and stator pole overlap, with the slopes of the curves monotonically decreasing as the rotor advances from the aligned position to the unaligned position.

Figure 3:
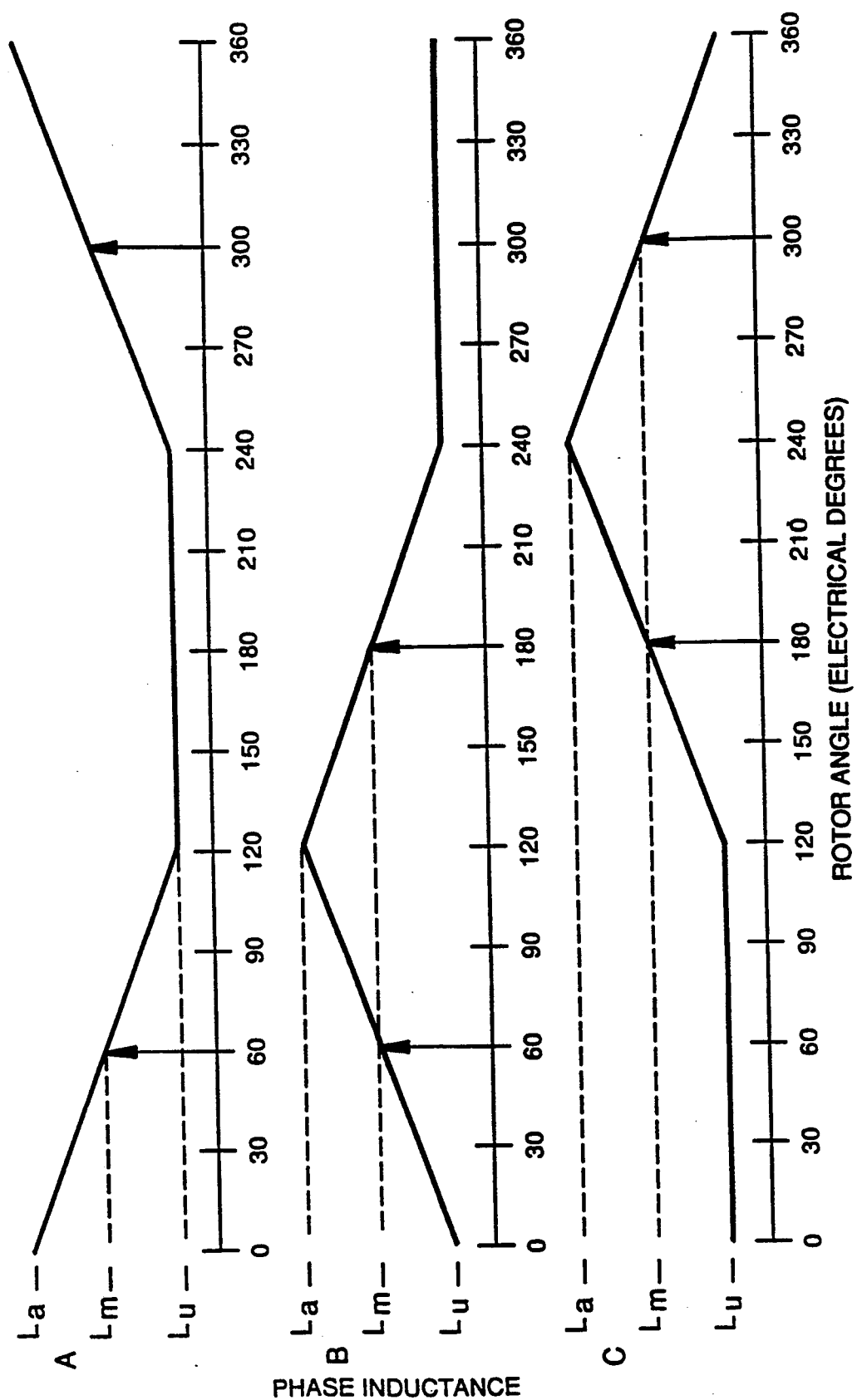
FIG. 3 is a graphical illustration of ideal phase inductance as a function of rotor angle for a three-phase SRM.

Ideal phase inductance (i.e., neglecting saturation and leakage flux) is plotted as a function of rotor angle $\theta$, in electrical degrees, for a three-phase machine in FIG. 3. (As will be appreciated by those skilled in the art, in a SRM having a three-phase, 6-4 pole configuration, such as that illustrated in FIG. 1, a mechanical degree is one-fourth of an electrical degree. However, since electronic commutation is the concern herein, all positions will be described in terms of electrical degrees.) In particular, phase inductance L is a two-valued function of rotor position $\theta$. That is, a given inductance value occurs once as the rotor poles are moving toward alignment with stator poles of a respective phase, and again as the poles are moving away from alignment. From equation (1), it is apparent that this value of inductance can be determined by corresponding measurements of phase flux $\Psi$ and phase current I. To this end, stator flux linkage $\Psi$ may be measured directly using well-known sensing coils; however, such coils are typically fragile and unreliable. Therefore, under most operating conditions, an accurate determination of phase flux linkage $\Psi$ can be made by employing the relationship between phase flux linkage $\Psi$, phase current I, and phase voltage V according to the following expression:

$$V = Ir + \frac{d\Psi}{dt}, \quad (2)$$

where r is the phase winding resistance. An estimate of the flux linkage $\hat{\Psi}$ can thus be determined from:

$$\hat{\Psi} = \int(V - Ir)dt \quad (3)$$

Advantageously, since the flux linkage returns to zero at the end of each electrical cycle in a SRM, an integrator employed to estimate the flux linkage $\hat{\Psi}$ can be reset to zero at the end of each cycle, thus avoiding an accumulation of errors.

In a preferred embodiment of the present invention, a lock detector uses inductance estimates, which are based on phase flux measurements, to monitor the rotor angle estimates provided by a SRM rotor position estimator. If the rotor position estimator is not operating in-phase with and at the same frequency as the actual machine rotation, then the lock detector detects an out-of-lock condition, and provides a signal to disable the power electronics driving the SRM.

In general, the lock detector of the present invention operates by estimating the phase inductance in one or more phases at specific sampling points in the electrical cycle. For example, if the current and flux in each machine phase are sampled at the points at which the stator poles thereof overlap rotor poles so that their axes coincide, then the phase inductance $L_m$ at those points can be determined according to the following expression:

$$L_m = \frac{L_a + L_u}{2}. \quad (4)$$

The sampling instants corresponding to the respective midpoint inductances $L_m$ for the three phases are illustrated by arrows in FIG. 3. (The midpoint inductance is chosen for illustrative purposes only; i.e., other operating points could be chosen as well.) If the estimated phase inductance at the sampling instants is not within a specified tolerance of the actual midpoint inductance $L_m$, then the lock detector of the present invention will indicate an out-of-lock condition, and the power electronics driving the SRM will be disabled.

Figure 4:
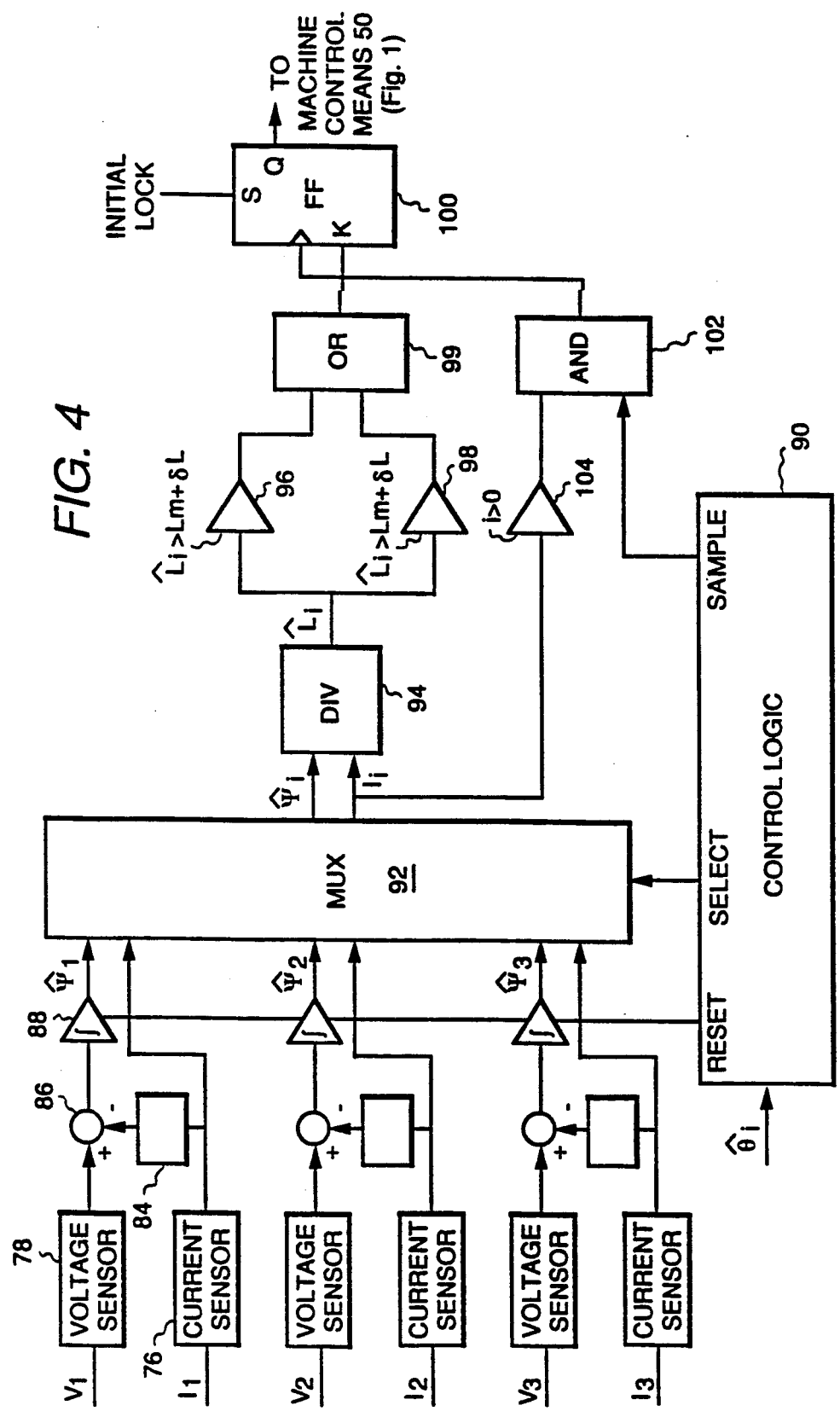
FIG. 4 is a block diagram of a preferred embodiment of a lock detector according to the present invention.

FIG. 4 shows a preferred hardware implementation of the lock detector of the present invention. Phase current measurements ($I_1$, $I_2$ and $I_3$), phase voltage measurements ($V_1$, $V_2$ and $V_3$), and rotor angle estimates $\hat{\theta}_i$ are supplied as inputs to the lock detector. The rotor angle estimates $\hat{\theta}_i$ are provided by a suitable rotor position estimator, such as that described in Lyons et al. patent application Ser. No. 653,374, cited hereinabove. The method of Lyons et al., Ser. No. 653,374, involves instantaneous phase flux and phase current sensing in a predetermined sequence that depends on the particular quadrant of operation, i.e. forward motoring, reverse motoring, forward generating, or reverse generating. For each phase in the predetermined sequence of sensing, phase flux and phase current measurements are made at a pair of sampling instants (or, alternatively, in an analog implementation, during a pair of sensing regions) as determined from phase inductance versus rotor angular position curves for a particular SRM. At each sampling instant, instantaneous phase current and flux measurements are made, and corresponding rotor angle estimates $\hat{\theta}_i$ are derived therefrom. A rotor angle estimate $\hat{\theta}_i$ for each phase is a measure of how far the rotor poles of the SRM are from alignment with the stator poles of the phase being measured.

Figure 5:
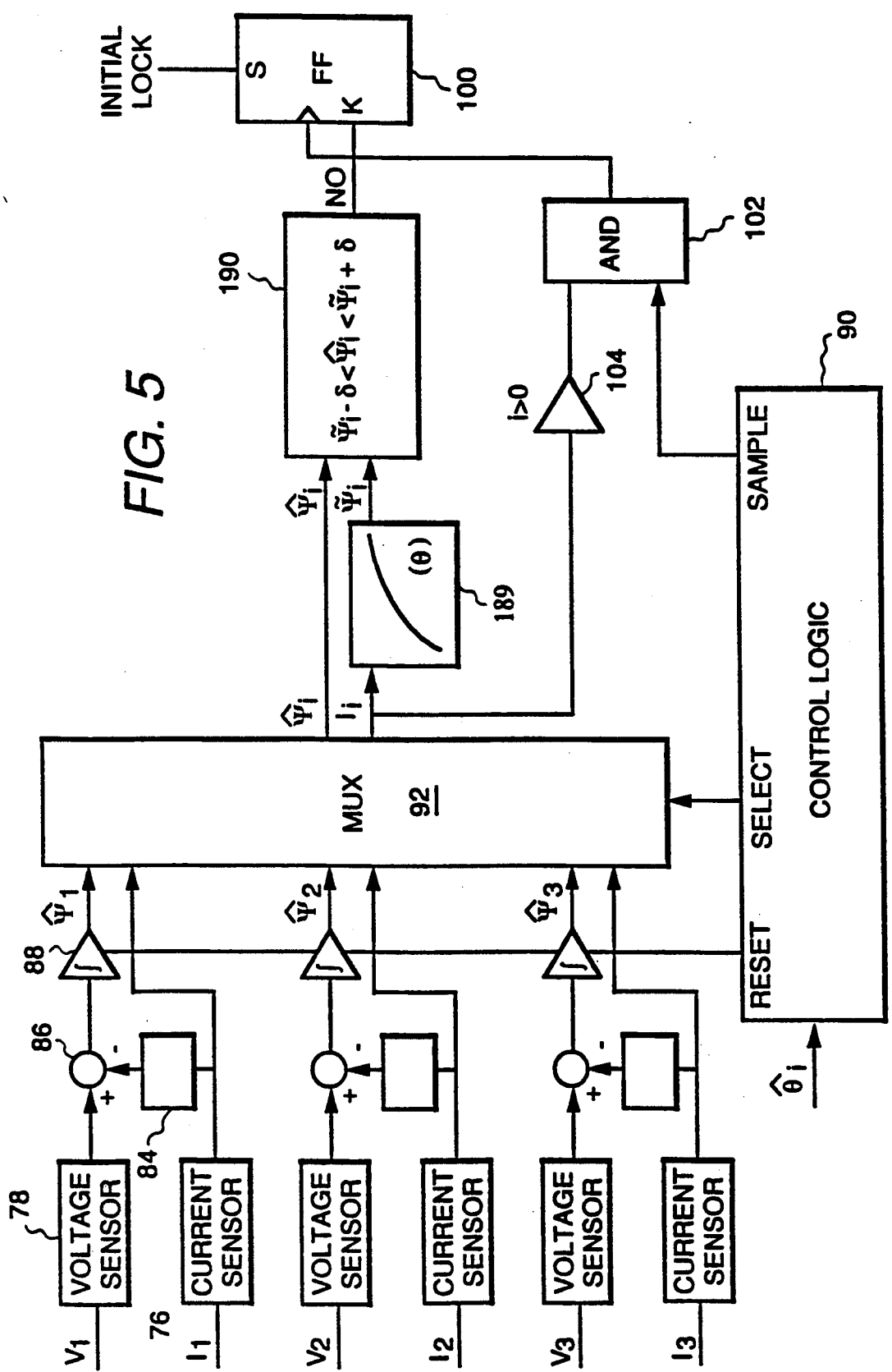
FIG. 5 is a block diagram of an alternative embodiment of a lock detector according to the present invention.

As shown in FIG. 4, the phase angle estimates $\hat{\theta}_i$ from a suitable position estimator, such as that of Lyons et al. patent application Ser. No. 653,374, are provided to a lock detector control means 90. The phase current for each respective phase ($I_1$, $I_2$ and $I_3$) is sensed by a suitable current sensor 76 (e.g., a Hall-effect sensor, sensing transformer, or sensing resistor), and the phase winding voltage ($V_1$, $V_2$ and $V_3$) is sensed by a suitable voltage sensor 78 or is otherwise determined by a suitable indirect method for estimating voltage. The phase voltages (Vhd 1, $V_2$ and $V_3$) and phase currents ($I_1$, $I_2$ and $I_3$) are processed, in similar manner as shown in FIG. 5, to provide phase flux estimates $\hat{\Psi}_1$, $\hat{\Psi}_2$ and $\hat{\Psi}_3$. At each sampling instant, the phase flux estimate corresponding to the sampled phase angle estimate $\theta_i$ is selected and provided by multiplexer 92, which is enabled by lock detector control means 90, to a dividing block 94. The corresponding phase current measurement $I_i$ is likewise selected and provided to dividing block 94.

In an alternative preferred embodiment, voltage, current and position measurements are taken for only one phase of a multi-phase SRM. That is, the principles of the lock detector of the present invention require samples from only one phase, but more phases may be sampled, if desired. Furthermore, the principles of the present invention are equally applicable to both single-phase and multi-phase SRM's.

In the dividing block of FIG. 4, an estimate of the phase inductance $\hat{L}_i$ is determined according to:

$$\hat{L}_i = \frac{\hat{\Psi}_1}{I_i} \quad (5)$$

The phase inductance estimates $\hat{L}_i$ are provided to first and second comparators 96 and 98 for determining whether the respective phase inductance estimate is within a specified tolerance of the midpoint inductance $L_m$. Specifically, comparator 96 generates a logic level one signal at its output if:

$$\hat{L}_i > L_m + \delta L, \quad (6)$$

and comparator 98 generates a logic level one signal at its output if $$\hat{L}_i < L_m - \delta L. \quad (7)$$

The output signals from comparators 96 and 98 are provided as inputs to an OR-gate 99 which provides a logic level one signal to reset a lock flip-flop 100 whenever the phase inductance estimate is not within the specified tolerance of the midpoint inductance value $L_m$; i.e., the position estimator has lost lock. When an out-of-lock condition is thus detected, a logic level zero signal is provided to the machine control means (FIG. 1) to disable the SRM drive.

The lock flip-flop is clocked by control means 90 via a two-input AND-gate 102. In particular, in the embodiment of FIG. 5, a logic level one signal is provided to one input of AND-gate 102 by control means 90 at each rotor angle sampling instant. The other input to AND-gate 102 is generated from a comparison of the corresponding phase current signal $I_i$ from multiplexer 92 with a zero reference in a comparator 104 so that, for positive values of phase current, a logic level one signal is provided thereto.

FIG. 5 illustrates an alternative preferred embodiment of a lock detector according to the present invention which uses the fact that phase flux is proportional to phase inductance. In particular, dividing block 94, comparators 96 and 98, and OR gate 99 of FIG. 4 have been replaced by a flux-current mapping block 189 and a flux-map comparator 190, as shown in FIG. 5. Such a flux-current mapping block 189 and a flux-map comparator 190 are employed in a rotor position estimator described in U.S. patent application Ser. No. 07/760,639 cited hereinabove. Flux-current map block 189 contains a flux-current map according to the expression:

$$\tilde{\Psi}_i = f(I) \text{ at } \theta_i, \quad (8)$$

where the functional relationship f corresponds to a $\Psi - I$ curve for the respective rotor angle angle $\theta_i$, such as those $\Psi - I$ curves illustrated in FIG. 2. The function f could be easily modeled as a piecewise linear function using a combination of diodes and operational amplifiers according to methods well-known in the art. The flux linkage estimate $\Psi_i$ from MUX 92 is compared with the flux reference $\Psi_i$ in fluxcurrent map comparator 190. If the flux linkage estimate $\Psi$ is outside a specified tolerance of the flux reference $\Psi_i$, according to the following expression:

$$\tilde{\Psi}_i - \delta < \hat{\Psi} < \tilde{\Psi}_i + \delta \quad (9)$$

then the position estimator has lost lock. When an out-of-lock condition is thus detected, a logic level one signal is provided to reset lock flip-flop 100 which, in turn, generates a logic level zero signal to machine control means 50 (FIG. 1) to disable the SRM drive.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A lock detector for a switched reluctance motor position estimator, comprising:
   control means for sampling rotor angle estimates from said position estimator;
   current sensing means for sensing phase current in at least one phase of the switched reluctance motor;
   flux sensing means for sensing phase flux in at least said one phase of said switched reluctance motor;
   inductance-estimating means for receiving each respective phase flux and phase current measurement and generating a phase inductance estimate corresponding thereto; and logic means for determining whether each respective phase inductance estimate is within a predetermined tolerance of a theoretical value of inductance and generating a logic level signal indicative thereof.

2. The lock detector of claim 1 wherein said logic means comprises:

first comparison means for comparing each respective phase inductance estimate to a lower limit and generating a logic level one signal whenever a respective phase inductance is less than said lower limit;

second comparison means for comparing each respective phase inductance estimate to an upper limit and generating a logic level one signal whenever a respective phase inductance is greater than said lower limit;

OR-gate means for receiving the output signals from said first and second comparison means and performing a logical OR function thereon; and flip-flop means coupled to said OR-gate means for generating a signal to disable the switched reluctance motor when said phase inductance is not between said lower and upper limits.

3. The lock detector of claim 1 wherein said flux sensing means comprises:

voltage sensing means for sensing the voltage V across the respective phase winding; and integrator means for providing an estimate of the phase flux $\hat{\Psi}$ according to the expression:

$$\hat{\Psi} = \int (V - Ir) dt,$$

where r is the phase winding resistance, and I is the phase current.

4. A lock detector for a switched reluctance motor position estimator, comprising:

control means for sampling rotor angle estimates from said position estimator;

current sensing means for sensing phase current in at least one phase of the switched reluctance motor;

flux sensing means for sensing phase flux in at least said one phase of said switched reluctance motor and generating a phase flux estimate corresponding thereto;

flux-current mapping means for providing a phase flux reference corresponding to the respective phase current measurement and sampled rotor angle estimate; and comparator means for determining whether each respective phase flux estimate is within a predetermined tolerance of the phase flux reference and generating a logic level signal indicative thereof.

5. The lock detector of claim 4 wherein said flux sensing means comprises:

voltage sensing means for sensing the voltage V across the respective phase winding; and means for providing an estimate of the phase flux $\hat{\Psi}$ according to the expression:

$$\hat{\Psi} = \int (V - Ir) dt,$$

where r is the phase winding resistance, and I is the phase current.

6. A method for monitoring rotor angle estimates generated by a rotor position estimator for a switched reluctance machine, comprising:

sampling rotor angle estimates from said position estimator;

sensing phase current in at least one phase of the switched reluctance motor and generating a phase current signal $I_i$ indicative thereof;

sensing phase flux in at least said one phase of said switched reluctance motor and generating a phase flux estimate $\hat{\Psi}_i$ indicative thereof;

generating a phase inductance estimate $\hat{L}_i$ from the respective phase current and phase flux signals according to the expression $$\hat{L}_i = \frac{\hat{\Psi}_i}{I_i}; \text{ and}$$

determining whether the phase inductance estimate is within a predetermined tolerance of a theoretical value of inductance.

7. The method of claim 6 wherein the step of sensing phase flux comprises:

sensing the voltage V across the respective phase winding; and providing an estimate of the phase flux $\Psi$ according to the expression:

$$\hat{\Psi} = \int (V - Ir) dt,$$

where r is the phase winding resistance, and I is the phase current.

8. A method for monitoring rotor angle estimates generated by a rotor position estimator for a switched reluctance machine, comprising:

sampling rotor angle estimates from said position estimator;

sensing phase current in at least one phase of the switched reluctance motor and generating phase current signals $I_i$ indicative thereof;

sensing phase flux in at least said one phase of said switched reluctance motor and generating phase flux estimates $\hat{\Psi}_i$ indicative thereof;

providing a phase flux reference corresponding to the respective phase current and phase flux measurements and the sampled rotor angle estimate using a flux-current map of the motor ; and determining whether the phase flux estimate is within a predetermined tolerance of the phase flux reference and generating a logic level signal indicative thereof.

9. The method of claim 8 wherein the step of sensing phase flux comprises:

sensing the voltage V across the respective phase winding; and providing an estimate of the phase flux $\Psi$ according to the expression:

$$\hat{\Psi} = \int (V - Ir) dt,$$

where r is the phase winding resistance, and I is the phase current.

* * * * *